(12) United States Patent
Kose et al.

(10) Patent No.: US 10,873,446 B2
(45) Date of Patent: Dec. 22, 2020

(54) FALSE KEY-CONTROLLED AGGRESSIVE VOLTAGE SCALING

(71) Applicants: Selcuk Kose, Tampa, FL (US); Weize Yu, Tampa, FL (US)

(72) Inventors: Selcuk Kose, Tampa, FL (US); Weize Yu, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 263 days.

(21) Appl. No.: 15/967,171

(22) Filed: Apr. 30, 2018

(65) Prior Publication Data

US 2018/0316488 A1 Nov. 1, 2018

Related U.S. Application Data

(60) Provisional application No. 62/491,346, filed on Apr. 28, 2017.

(51) Int. Cl.
*H04L 29/06* (2006.01)
*H04L 9/00* (2006.01)
(Continued)

(52) U.S. Cl.
CPC ............... *H04L 9/003* (2013.01); *G06F 1/28* (2013.01); *G06F 1/305* (2013.01); *G06F 1/3203* (2013.01); *H04L 9/3066* (2013.01)

(58) Field of Classification Search
CPC . H04L 63/1483; H04L 51/22; H04L 63/0245; G06N 20/00; G06Q 10/107
See application file for complete search history.

(56) References Cited

U.S. PATENT DOCUMENTS

| 2002/0190962 A1* | 12/2002 | Miura | G06F 1/3203 345/173 |
| 2010/0037325 A1* | 2/2010 | Westerinen | G06F 21/86 726/34 |

(Continued)

OTHER PUBLICATIONS

Baddam et al., "Evaluation of Dynamic Voltage and Frequency Scaling as a Differential Power Analysis Countermeasure", 20th International Conference on VLSI Design, (Year: 2007).*

(Continued)

*Primary Examiner* — Morshed Mehedi
(74) *Attorney, Agent, or Firm* — Thomas Horstemeyer, LLP

(57) ABSTRACT

Methods and systems are provided for single false key-controlled (SFKC) aggressive voltage scaling (AVS) and multiple parallel false key controlled (MPFKC) AVS countermeasure systems. When a plaintext value is input into a cryptographic circuit for modification by a correct key, power supplied to the cryptographic circuit is scaled based on a result of the plaintext value modified by a false key or by a random number of parallel false keys, which occurs during every clock cycle. The scaling may be triggered when the operating frequency of the cryptographic circuit falls below a threshold, which indicates occurrence of a leakage power attack. A key that is detectable within a power trace of the scaled power provided to the cryptographic circuit, with a highest correlation coefficient relative to a known key, is a key other than the correct key. The MPFKC AVS technique also inhibits unriddling of the input power scaling scheme.

18 Claims, 6 Drawing Sheets

(51) Int. Cl.
G06F 1/28 (2006.01)
H04L 9/30 (2006.01)
G06F 1/3203 (2019.01)
G06F 1/30 (2006.01)

(56) References Cited

U.S. PATENT DOCUMENTS

2010/0166177 A1* 7/2010 Sirio .................. G06F 7/00
 380/30
2017/0169220 A1* 6/2017 Fish ............... H03K 19/17768
2018/0309566 A1* 10/2018 Buch .................. H04L 9/003

OTHER PUBLICATIONS

Yu et al., "False Key-Controlled Aggressive Voltage Scaling: A Countermeasure Against LPA Attacks", IEEE Transactions on Computer-Aided Design of Integrated Circuits and Systems, Date of Publication: Mar. 14 (Year: 2017).*
Ahmad et al., "Low-power compact composite field AES S-Box/Inv S-Box design in 65 nm CMOS using novel XOR gate," Integr. VLSI J., 2013, 46(4): 333-344.
Alioto et al., "Effectiveness of leakage power analysis attacks on DPA-resistant logic styles under process variations", IEEE Trans. Circuits Syst. I Reg. Papers, 2014, 61(2): 429-442.
Alioto et al., "Leakage power analysis attacks: A novel class of attacks to nanometer cryptographic circuits," IEEE Transactions on Circuits and Systems I: Regular Papers, 2010, 57(2): 355-367.
Andersen et al., "A 4.6 W/mm 2 power density 86% efficiency on-chip switched capacitor DC-DC converter in 32 nm SOI CMOS," Proc. Appl. Power Electron. Conf. Expo. (APEC), 2013, pp. 692-699.
Avirneni et al., "Countering power analysis attacks using reliable and aggressive designs," IEEE Transactions on Computers, 2014, 63(6): 1408-1420.
Baddam et al., "Evaluation of dynamic voltage and frequency scaling as a differential power analysis countermeasure," Proc. 20th Int. Conj VLSI Des., 2007, pp. 854-862.
Jeon, "Fully integrated on-chip switched capacitor DC-DC converters for battery-powered mixed-signal SoCs," Ph.D. dissertation, Dept. Electr. Comput. Eng., Northeastern Univ., Boston, MA, USA, Oct. 2012.
Kar et al., "Exploiting fully integrated inductive voltage regulators to improve side channel resistance of encryption engines," Proc. ISLPED, 2016, pp. 130-135.
Kopf et al., "An information-theoretic model for adaptive side-channel attacks," Proc. CCS, 2007, pp. 286-296.

Kopf et al., "Vulnerability bounds and leakage resilience of blinded cryptography under timing attacks," Proc. IEEE CSF, 2010, pp. 44-56.
Maghrebi et al., "Entropy-based power attack," Proc. IEEE Int. Symp. HOST, pp. 1-6.
Moradi, "Side-channel leakage through static power-should we care about in practice?," Springer Cryptographic Hardware and Embedded Systems, 2014, pp. 562-579.
Pozo et al., "Side-channel attacks from static power: When should we care?," Proc. Design, Autolllation and Test in Europe (Date), 2015, pp. 145-150.
Ramadass et al., "A fully-integrated switched-capacitor step-down dc-dc converter with digital capacitance modulation in 45 nm CMOS," IEEE J. Solid-State Circuits, 2010, 45(12): 2557-2565.
Seeman, "A design methodology for switched-capacitor DC-DC converters," Ph.D. dissertation, Electr. Eng. Comput. Sci., Univ. California Berkeley, Berkeley, CA, USA, May 2009.
Standaert et al., "An overview of power analysis attacks against field programmable gate arrays," Proc. IEEE, 2006, 94(2):383-394.
Tokunaga et al., "Securing encryption systems with a switched capacitor current equalizer," IEEE J. Solid-State Circuits, 2010, 45(1): 23-31.
Uzun et al., "Converter-gating: A power efficient and secure on-chip power delivery system," IEEE J. Emerging Sel. Topics Circuits Syst., 2014, 4(2): 169-179.
Yu et al., "A voltage regulator-assisted lightweight AES implementation against DPA attacks," IEEE Transactions on Circuits and Systems I: Regular Papers, 2016, 63(8): 1152-1163.
Yu et al., "Charge-Withheld Converter-Reshuffling: A Countermeasure Against Power Analysis Attacks," in IEEE Transactions on Circuits and Systems II: Express Briefs, 2016, 63(5): 438-442.
Yu et al., "Exploiting voltage regulators to enhance various power attack countermeasures," IEEE Transactions on Emerging Topics in Computing, 2016, 6(2): 244-257.
Yu et al., "False Key-Controlled Aggressive Voltage Scaling: A Countermeasure Against LPA Attacks," IEEE Transactions on Computer-Aided Design of Integrated Circuits and Systems, 2017, 36(12): 2149-2153.
Yu et al., "Leveraging on-chip voltage regulators as a countermeasure against side-channel attacks," Proc. IEEE DAC, 2015, pp. 1-6.
Yu et al., "Security-Adaptive Voltage Conversion as a Lightweight Countermeasure Against LPA Attacks," IEEE Transactions on Very Large Scale Integration (VLSI) Systems, 2017, 25(7): 2183-2187.
Yu et al., "Time-delayed converter-reshuffling: An efficient and secure power delivery architecture," IEEE Embedded Syst. Lett., 2015, 7(3): 73-76.
Zhu et al., "Employing symmetric dual-rail logic to thwart LPA Attack," IEEE Embedded Systems Letters, 2013, 5(4): 51-64.

* cited by examiner

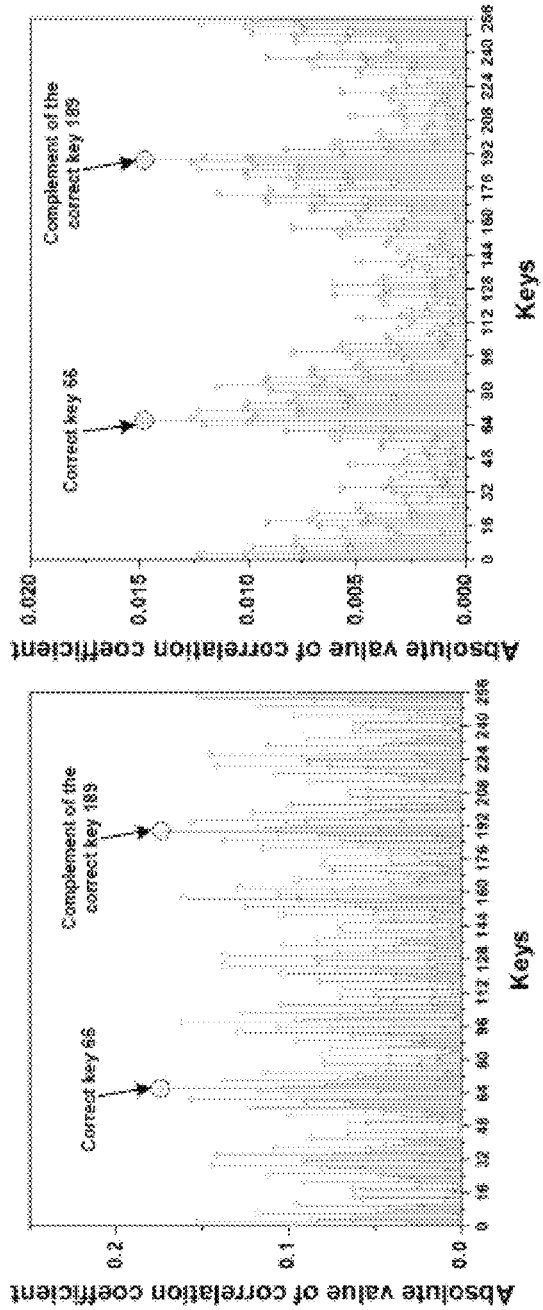
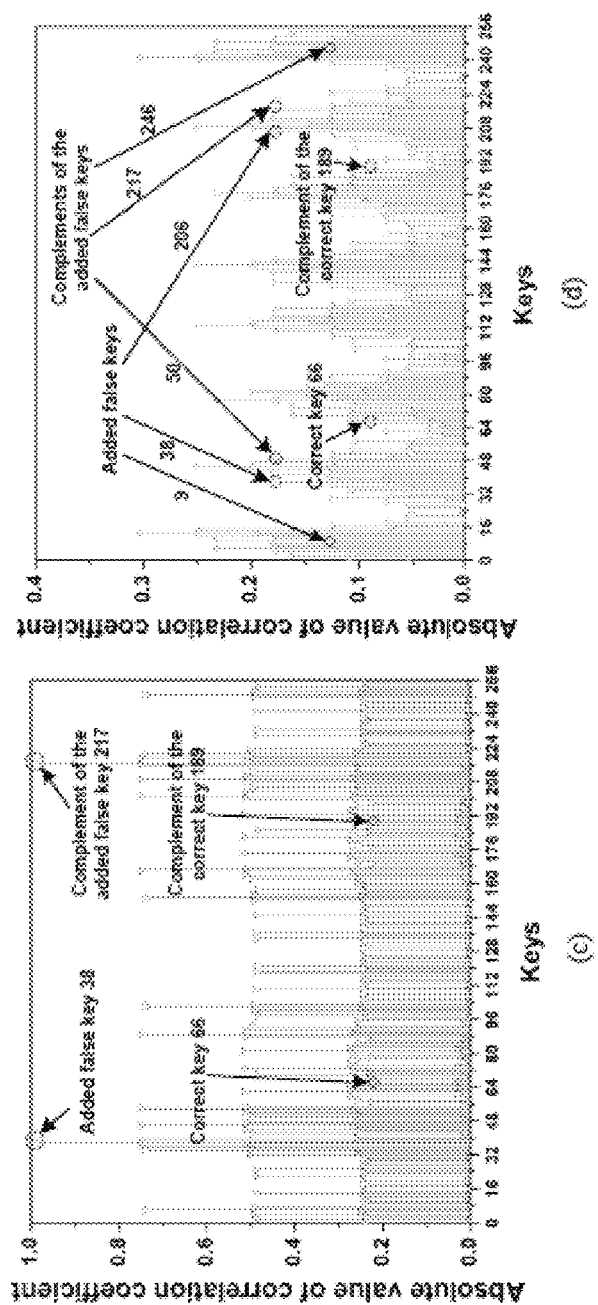
FIG. 6A  FIG. 6B  FIG. 6C  FIG. 6D

FALSE KEY-CONTROLLED AGGRESSIVE VOLTAGE SCALING

CROSS-REFERENCE TO RELATED APPLICATION(S)

This application claims the benefit of priority to U.S. Provisional Patent Application No. 62/491,346, which was filed on Apr. 28, 2017, the entire content of which are incorporated herein by reference in its entirety.

STATEMENT REGARDING FEDERALLY SPONSORED RESEARCH OR DEVELOPMENT

This invention was made with government support CCF1350451 awarded by the National Science Foundation. The Government has certain rights to the invention.

TECHNICAL FIELD

The invention generally relates to systems and methods for countermeasure against leakage power analysis (LPA) attacks. More specifically, the invention relates to controlling supply voltage scaling utilizing a random number of false keys.

SUMMARY OF THE INVENTION

Systems and methods for a false key-controlled aggressive voltage scaling technique is provided as a countermeasure against leakage power analysis attacks. A random number of false keys are utilized to control a supply voltage scaling to mask possible leakage of information related to a correct key to a malicious attacker. Contrary to a random aggressive voltage scaling technique, false key-controlled aggressive voltage scaling technique can guarantee that the added false keys exhibit higher correlation coefficients than that of the correct key even when a sufficient number of plaintext inputs (>10 million) are enabled. As demonstrated with simulation results, the measurement-to-disclose (MTD) value of a cryptographic circuit can be enhanced over 10 million against leakage power analysis (LPA) attacks by utilizing the technique provided herein, while the MTD values of a conventional cryptographic circuit without a countermeasure and one with random aggressive voltage scaling are, respectively, less than 500 and 100,000.

In some embodiments, the invention provides a system provided for false key-controlled voltage scaling that includes a power supply that provides power to a cryptographic circuit. An electronic controller of the system is operatively coupled to the power supply. The electronic controller receives a plaintext value that is also input to the cryptographic circuit, where the cryptographic circuit modifies the plaintext value with a correct key. The electronic circuit scales the power provided to the cryptographic circuit based on a result of the plaintext value modified by a first false key.

In some embodiments, the invention provides a method for false key-controlled voltage scaling that includes providing power to a cryptographic circuit by a power supply. An electronic controller operatively coupled to the power supply receives a plaintext value that is also input to the cryptographic circuit, where the cryptographic circuit modifies the plaintext value with a correct key. The electronic controller scales the power provided to the cryptographic circuit based on a result of the plaintext value modified by a first false key.

Other aspects of the invention will become apparent by consideration of the detailed description and accompanying drawings.

BRIEF DESCRIPTION OF THE DRAWINGS

FIGS. 6A-6D illustrate plots of different keys versus absolute values of correlation coefficients under leakage power analysis (LPA) attack simulation, according to some embodiments.

DETAILED DESCRIPTION

Figure 1:
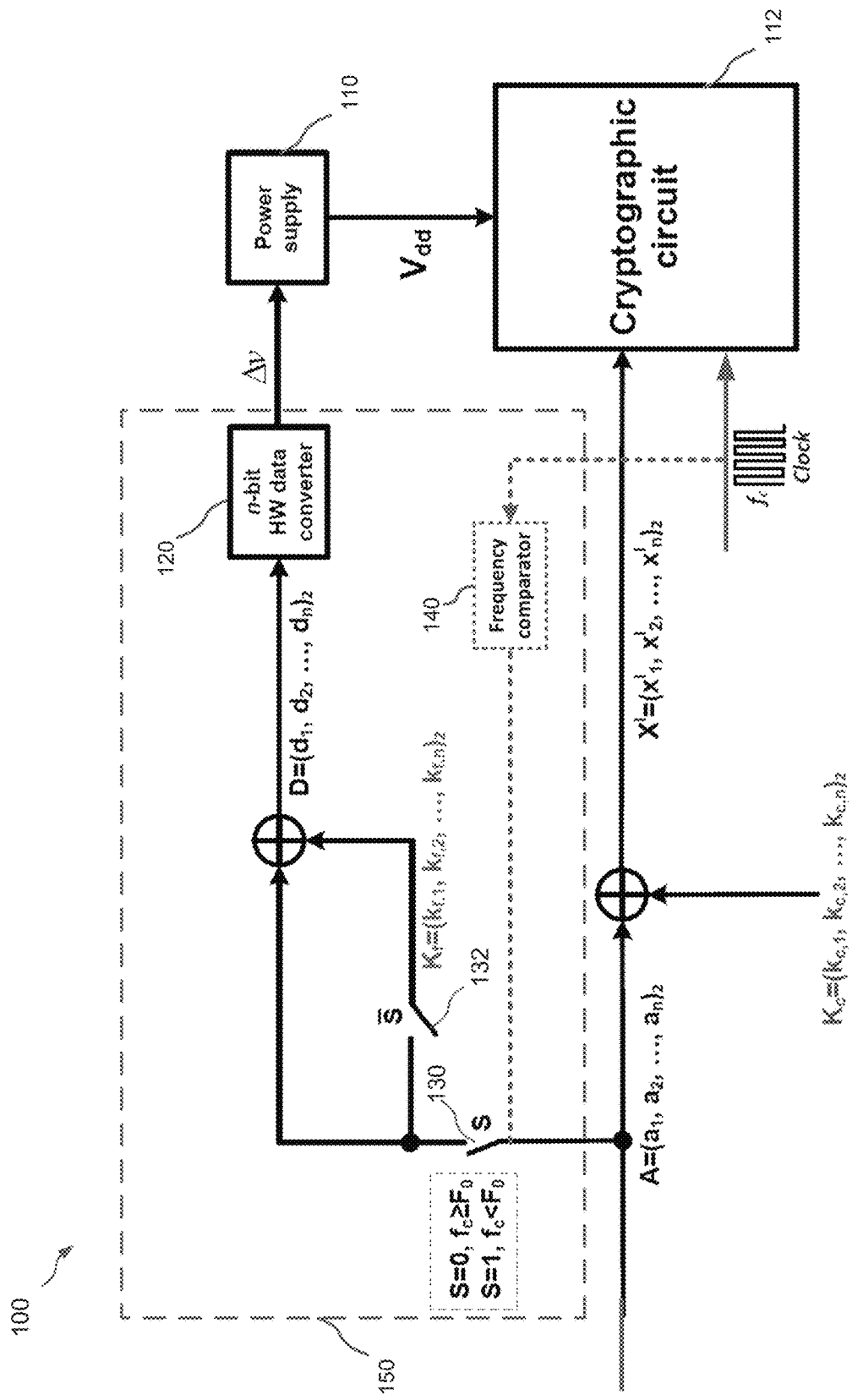
FIG. 1 illustrates an example of a single false key-controlled (SFKC) aggressive voltage scaling (AVS) countermeasure system, according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways It should also be noted that a plurality of hardware and software based devices, as well as a plurality of different structural components, may be used to implement various embodiments described herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (e.g., stored on non-transitory computer-readable medium) executable by one or more processors. As such, it should be noted that a plurality of hardware and software based devices, as well as a plurality of different structural components may be utilized to implement various embodiments. Furthermore, and as described in subsequent paragraphs, the specific configurations illustrated in the drawings are intended to exemplify embodiments and that other alternative configurations are possible. For example, "controllers" described in the specification can include standard processing components, such as one or more processors, one or more computer-readable medium modules, one or more input/output interfaces, and various connections (e.g., a system bus) connecting the components. In some instances, the controllers described in the specification may be implemented in one of or a combination of a general processor, an application specific integrated circuit (ASIC), a digital signal processor (DSP), a field programmable gate array (FPGA), combinational logic or state circuitry, or the like.

Critical information such as a secret or private keys used in modern integrated circuits can be leaked to a malicious attacker through power analysis attacks. Leakage power analysis (LPA) attacks are successfully implemented on cryptographic circuits in circuit level simulations. However, when executed against an actual circuit (i.e., field-programmable gate array (FPGA)), LPA attacks seem to be ineffective. The main reason is that the amplitude of the leakage power dissipation of a cryptographic circuit is typically quite low relative to the dynamic power dissipation. Measurement noise therefore becomes critical in LPA attacks, possibly making LPA attacks inefficient. The measurement noise can, however, be filtered utilizing techniques such as average sampling analysis. LPA attacks can therefore become effective if the attacker has the ability to significantly lower the operating frequency of the cryptographic circuit to perform average sampling analysis.

In some LPA attacks, a hacker may attempt to determine a secret key that is being processed by a cryptographic circuit based on power that is input to the circuit while the secret key is being processed. Having knowledge of predicted (or simulated) leakage power levels for possible secret keys, the actual key being processed (the correct key) can be determined based on correlation coefficients between the predicted leakage power dissipation values and actual the leakage power dissipation as measured for a sufficient number of plaintext values applied to the cryptographic circuit (i.e., the highest correlation coefficient corresponds to the correct key). Therefore, if a countermeasure that introduces false keys can guarantee that the correlation coefficients of the false keys are always higher than the correlation coefficient of the correct key, even after a sufficient number of plaintext values are applied, potential threats from LPA attacks may be eliminated.

Discovery of leakage power analysis (LPA) attacks is quite recent, therefore, there are only a few existing countermeasures. Symmetric dual-rail logic (SDRL) is a countermeasure against LPA attacks. A cryptographic circuit built with SDRL can achieve approximately constant leakage power dissipation under different input data. However, this countermeasure would double both the power consumption and the area of a cryptographic circuit since the symmetric dual-rail logic requires more area than the conventional CMOS gates and consumes more power to flatten the input power profile. Random dynamic voltage and frequency scaling (RDVFS) with switched-capacitor voltage converters is also a countermeasure against LPA attacks because the leakage power dissipation of a cryptographic circuit strongly correlates with supply voltage. However, this countermeasure may be foiled by filtering power noise generated by the randomly altered supply voltage levels by increasing the number of measurements.

An adaptive false key-controlled aggressive voltage scaling is provided as a countermeasure against LPA attacks. When LPA attacks are sensed by a cryptographic circuit, the input plaintext values are added to a false key to generate a signal that controls scaling of the supply voltage. Since the supply voltage strongly correlates with the actual leakage power dissipation of a cryptographic circuit, there is a strong correlation between the added false key and actual leakage power dissipation that is measured in an LPA attack. If the correlation coefficient of the added false key is higher than the correlation coefficient of the correct key, the attacker may regard the added false key as the correct key. With regard to an adding the false key to the plaintext, the process of adding may include a Boolean operation such as logically combining a value of the false key with a value of the plaintext utilizing an exclusive- or operation. However, other operations may be performed in order to add the false key value and the plaintext value.

Since a single added false key strongly correlates with the scaling behavior of the supply voltage, if the attacker realizes that the key with the highest correlation coefficient is not the correct key and instead is an added false key, the added false key may be utilized to unriddle the scaling behavior acting on the supply voltage. Therefore, the correct key can still be determined by the attacker. In order to further scramble a leakage power trace, a random number of false keys are added to a plaintext value, for each clock period, to prevent the attacker from unriddling the supply voltage scaling pattern and as a result, protecting the correct key from observation by the attacker.

FIG. 1 illustrates an example of a single false key controlled (SFKC) aggressive voltage scaling (AVS) countermeasure system, according to some embodiments. Shown in FIG. 1 is single false key based countermeasure system 100 comprising an SFKC AVS controller 150, a power supply 110, a cryptographic circuit 112, an n-bit Hamming-weight data converter 120, a frequency comparator 140, a first switch 130 (S) and a complimentary second switch 132 ($\overline{S}$). As shown in FIG. 1, the first switch 130 when set equal to zero (S=0) represents the first switch 130 (S) in an off-state and the complementary second switch 132 ($\overline{S}$) in an on-state. The first switch 130 when set equal to one (S=1) represents the switch first switch 130 (S) in an on state and the complimentary second switch 132 ($\overline{S}$) is in the off state.

The cryptographic circuit 112 is operable to utilize data such as a key for processing input data such as plaintext or ciphertext. The key may be a secret key and may be referred to as the correct key. In some embodiments, the cryptographic circuit 112 is operable to perform encryption schemes utilizing the secret key, for example, to encrypt plaintext or decrypt ciphertext. A clock signal may be generated external to the cryptographic circuit 112 to control the operating frequency of the cryptographic circuit 112. In some embodiments, the clock signal may be generated internal to the cryptographic circuit 112 or the SFKC AVS controller 150.

The powers supply 110 provides power to the cryptographic circuit 112. In some embodiments, the power supply 110 includes a voltage converter such as a switched capacitor, linear, or inductive-based voltage converter. However, the power supply 110 is not limited to any specific type of power supply.

The SFKC AVS controller 150 includes suitable logic, circuitry, interfaces, and/or code that are operable to implement SFKC AVS techniques described herein. The SFKC AVS controller 150 includes a basic architecture for implementing a single false key controlled aggressive voltage scaling technique. The n-bit input plaintext $A=(a_1, a_2, \ldots, a_n)_2$ is added to the correct key $K_c=(K_1, K_2, \ldots, K_{c,n})_2$ to generate the input data of the cryptographic circuit $X^I=(x_1^I, x_2^I, \ldots x_n^I)_2$.

In some embodiments, the SFKC AVS controller 150 includes a frequency comparator that compares an operating frequency $f_c$ of the cryptographic circuit 112 to a reference frequency threshold.

When the cryptographic circuit is under an LPA attack, the attacker may lower the operating clock frequency $f_c$ to mitigate the measurement noise. In some embodiments, the SFKC AVS controller 150 includes a frequency comparator 140 that compares an operating frequency $f_c$ of the cryptographic circuit 112 to a specified reference frequency threshold $F_o$. The reference frequency threshold $F_o$ may be equal to or above a critical operating clock frequency that is the slowest frequency that is still fast enough to prevent the attacker from filtering the measurement noise and thus makes LPA attacks inefficient. When the SFKC AVS controller 150 detects that the operating clock frequency is lower than the specified threshold $F_o$, the SFKC AVS countermeasure processes are implemented. For example, when the frequency comparator 140 detects that the clock frequency $f_c$ is lower than the specified reference clock frequency $F_o$, the first switch 130 (S) is turned-on and the complementary second switch 132 ($\bar{S}$) is turned-off. As a result, the input plaintext $A=(a_1, a_2, \ldots, a_n)_2$ is also added to the false key $K_f=(K_{f,1}, K_{f,2}, \ldots, K_{f,n})_2$ to generate the false key related data $D=(d_1, d_2, \ldots, d_n)_2$; ($D=A\oplus K_f$). As illustrated in FIG. 1, the digital false key related data D is converted into an analog voltage signal $\Delta_v$ by an n-bit Hamming-weight (HW) data converter 120. The analog voltage signal $\Delta_v$ is used to scale the power provided to the cryptographic circuit 112.

In some embodiments, the SFKC AVS controller 150 may implement SFKC AVS process independent of the rate of the operating clock frequency $f_c$ of the cryptographic circuit 112. For example, the SFKC AVS controller 150 may add the false keys $K_f$ to the input plaintext values A and convert the false key related data D to analog voltage for scaling the power supplied to the cryptographic circuit 112 for all input plaintext values A or for any determined number of input plaintext values A. In this regard, the single false key based countermeasure system 100 may not include the frequency comparator 140.

Figure 2:
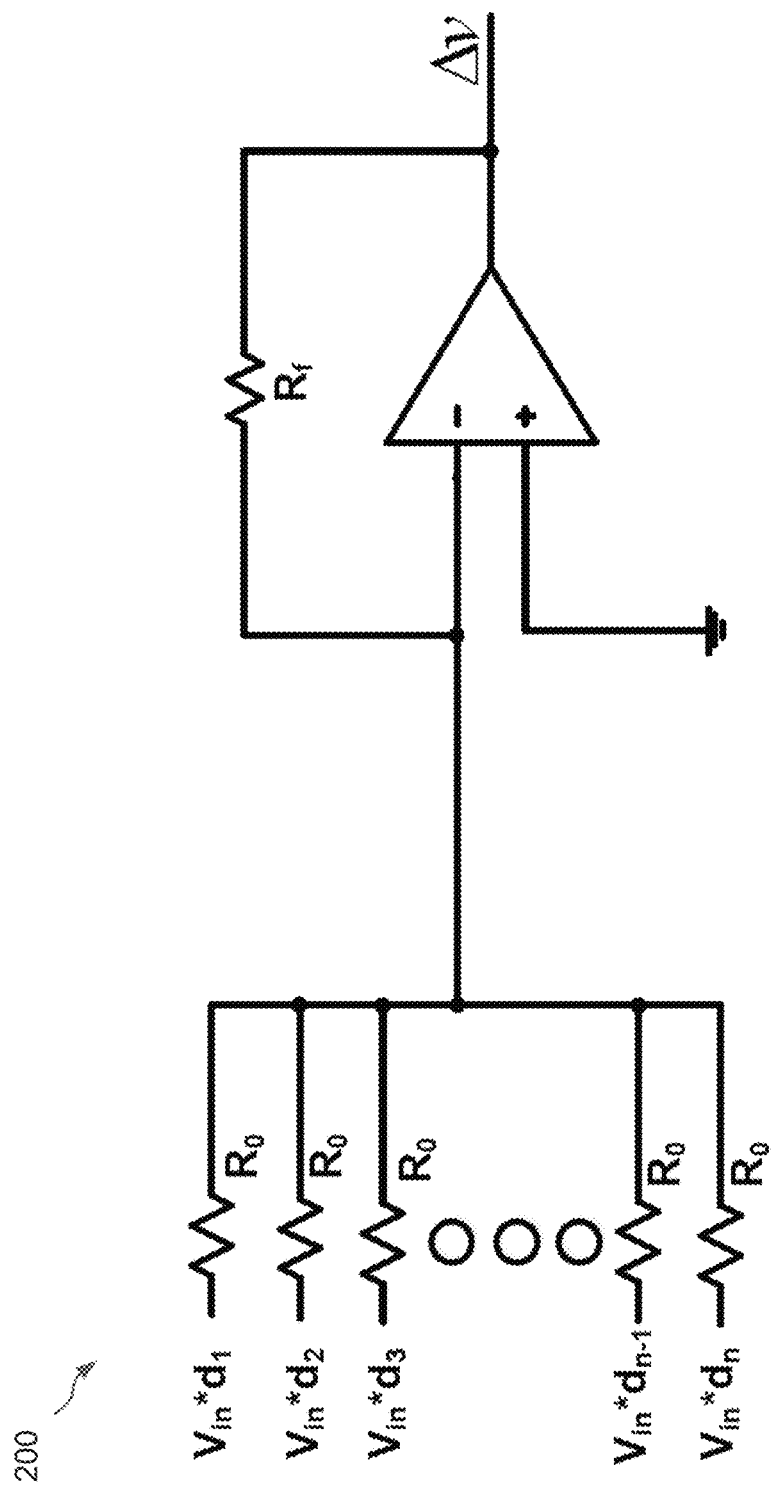
FIG. 2 is a schematic diagram for an example circuit of an n-bit Hamming-weight (HW) data converter, according to some embodiments.

FIG. 2 is a schematic diagram for an example circuit of an n-bit Hamming-weight (HW) data converter, according to some embodiments. A circuit 200 shown in FIG. 2 represents the n-bit HW data converter 120. The relationship between the false key related input data D and output voltage $\Delta_v$ of the HW data converter 120 can be written as:

$$\Delta v = \left(\sum_{i=1}^{n} d_i\right) \times \left(-\frac{V_{in}R_f}{R_0}\right) = \left(\sum_{i=1}^{n} d_i\right) v_0 = \left(\sum_{i=1}^{n} a_i \oplus k_{f,i}\right) v_0 \quad (1)$$

where $V_{in}$ is the voltage when the logic bit is equal to 1. $R_f$ and $R_0$ are, respectively, the feedback resistance and weight resistance of the circuit 200. $v_0$ can be considered as the output voltage resolution of the n-bit HW data converter 120.

The generated analog voltage $\Delta v$ which strongly correlates with the false key $K_f$ is used to control scaling of the supply voltage $V_{dd}$ that is input to the cryptographic circuit 112. The modulated supply voltage $V_{dd}$ can be denoted as $$V_{dd} = V_{dd,0} + \Delta v = V_{dd,0} + \left(\sum_{i=1}^{n} a_i \oplus k_{f,i}\right) v_0 \quad (2)$$

where $V_{dd,0}$ is the DC operating voltage of the cryptographic circuit 112 without any voltage scaling.

When the cryptographic circuit 112 is working in a normal mode (no LPA attack), the clock frequency $f_c$ is significantly higher than the critical frequency $F_0$ (or the reference frequency threshold), the switch S is in the off-state and the complementary switch $\bar{S}$ is in the on-state. Under this condition, the digital data D becomes (0, 0, ..., 0)$_2$ which is based on ($K_f \oplus K_f = (0, 0, \ldots, 0)_2$). As a result, the output voltage of the HW data converter 120 becomes $\Delta_v \approx 0$, indicating that the supply voltage $V_{dd}$ is fixed as $V_{dd,0}$ and the cryptographic circuit 112 is working in a normal mode.

Aggressive voltage scaling is a low overhead technique, which only reduces the performance of the cryptographic circuit 112 by 5%. Therefore, even if the proposed false key-controlled AVS process is turned-on when the cryptographic circuit 112 employs dynamic frequency scaling, the performance impact is negligible.

SFKC AVS technique masks the correct key with a single added false key that exhibits the highest correlation coefficient. However, the pattern of the supply voltage scaling may be unriddled to recover the correct key if the attacker utilizes that single added false key. In the multiple parallel false keys-controlled (MPFKC) AVS technique described with respect to FIG. 3, a random number of false keys are added to the plaintext input values in every clock period, making it significantly more difficult to determine the voltage supply scaling pattern.

Figure 3:
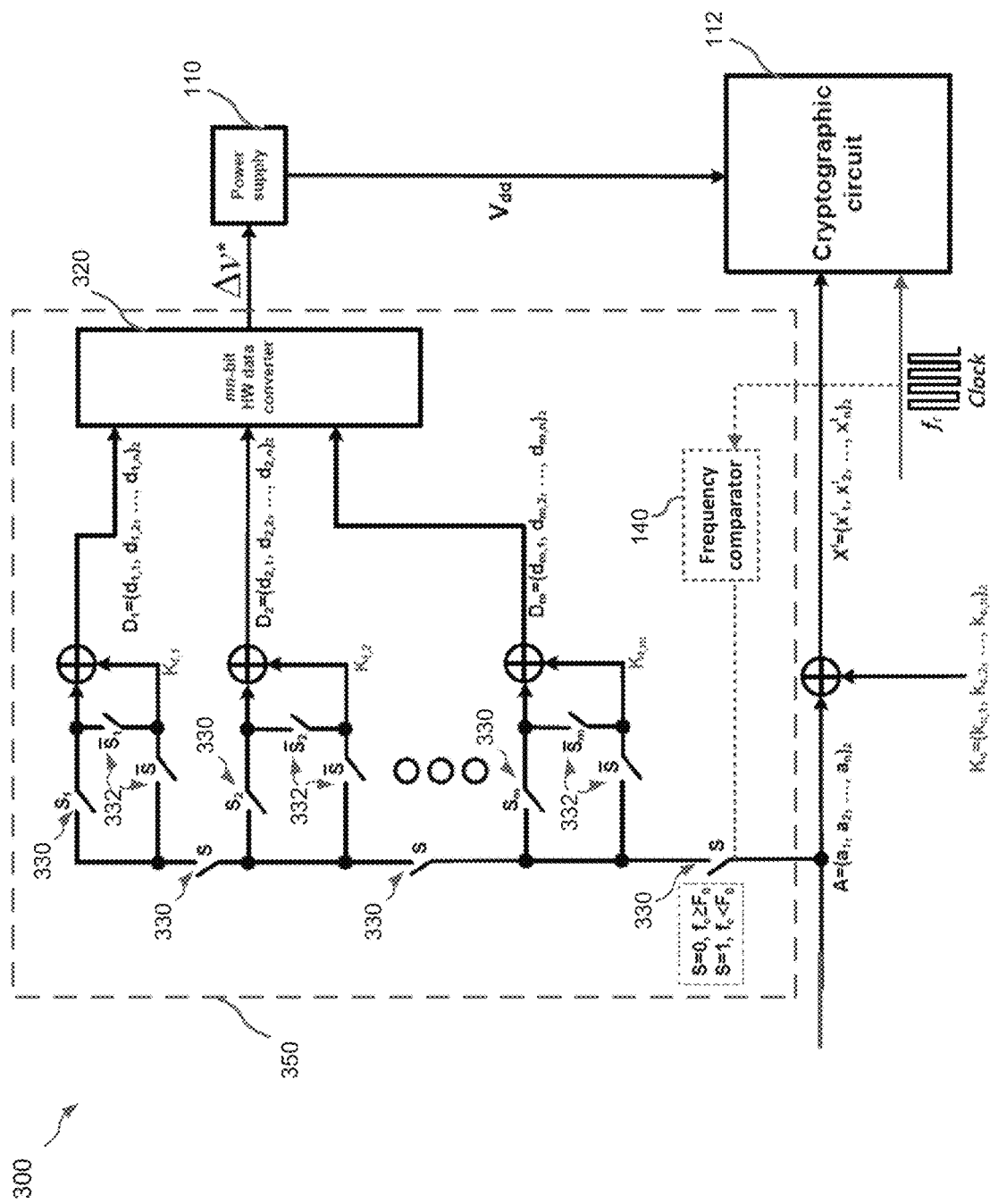
FIG. 3 illustrates an example of a multiple parallel false key controlled (MPFKC) aggressive voltage scaling (AVS) countermeasure system, according to some embodiments.

FIG. 3 illustrates an example of a multiple parallel false key controlled (MPFKC) aggressive voltage scaling (AVS) countermeasure system, according to some embodiments. Shown in FIG. 3 is a multiple parallel false keys based countermeasure system 300 including an MPFKC AVS controller 350, the cryptographic circuit 112, the power supply 110, the frequency comparator 140, an mn-bit Hamming-weight (HW) data converter 320, a first plurality of switches 330 (S, $S_1, S_2, \ldots, S_m$) and a complimentary second plurality of switches 332 ($\bar{S}, \bar{S}_1, \bar{S}_2, \ldots, \bar{S}_m$).

The second plurality of switches 332 ($\bar{S}, \bar{S}_1, \bar{S}_2, \ldots, \bar{S}_m$) are complementary switches of the first plurality of switches 330 (S, $S_1, S_2, \ldots, S_m$) respectively. S, $S_1, S_2, \ldots, S_m$=1 represents switches in an on state while S, S, $S_1, S_2, \ldots, S_m$=0 represents switches in an off-state. For the MPFKC AVS controller 350, the maximum number of added false keys in every clock period is assumed to be m, (m≥2) and all possible added false keys include $K_{f,1}, K_{f,2}, \ldots, K_{f,m}$. The first plurality of switches 330 ($S_1, S_2, \ldots, S_m$) are randomly turned-on and turned-off in every clock period to alter the number of added false keys in each clock period. The mn-bit HW data converter 320 is utilized to convert the digital false keys related data $D_1, D_2, \ldots, D_m$ into an analog voltage signal. The corresponding output voltage of the mn-bit HW data converter 320 $\Delta v^*$ is:

$$\Delta v^* = \sum_{j=1}^{m} S_j \sum_{i=1}^{n} d_{j,i} \times \left(-\frac{V_{in}R_f}{R_1}\right) = \quad (3)$$

$$\sum_{j=1}^{m} S_j \sum_{i=1}^{n} d_{j,i} v_1 = \left(\sum_{j=1}^{m} S_j \sum_{i=1}^{n} a_i \oplus k_{f,j,i}\right) v_1$$

where $S_j \in \{0, 1\}$, $R_1$ is the weight resistance of the mn-bit HW data converter 320, $k_{f,j,i}$ and $d_{j,i}$ are the $i^{th}$ bit of the $j^{th}$ added false key and the added false key related data, respectively, and $v_1$ is the output voltage resolution of the mn-bit HW data converter 320. As a result, the modulated supply voltage for the MPFKC AVS technique becomes $V_{dd}=V_{dd,0}+\Delta V^*$.

$V_w$ is the scaling width of supply voltage which is defined as the maximum value of $|V_{dd}-V_{dd,0}|$. When $V_w$ is the same for the SFKC AVS and MPFKC AVS techniques, the below equation (4) should be satisfied $$V_w = \left|n \times \left(-\frac{V_{in}R_f}{R_0}\right)\right| = \left|mn \times \left(-\frac{V_{in}R_f}{R_1}\right)\right|. \quad (4)$$

Therefore, the relationship between the weight resistances $R_0$ and $R_1$ is $R_1=mR_0$.

Similar to the method and system described with respect to FIG. 1, the MPFKC AVS controller 350 may implement the MPFKC AVS process independent of the rate of the operating clock frequency $f_c$ of the cryptographic circuit 112. For example, the MPFKC AVS controller 350 may add the random number of multiple false keys $K_{f,i}$ to the input plaintext values A and convert the corresponding multiple false key related data $D_i$ to analog voltage for scaling the power supplied to the cryptographic circuit 112 for all input plaintext values A or for any determined number of input plaintext values A. In this regard, the multiple false key based countermeasure system 300 may not include the frequency comparator 140.

However, in some embodiments, the multiple parallel false key based countermeasure system 300 includes the frequency comparator 140 that compares an operating frequency $f_c$ of the cryptographic circuit 112 to a reference frequency threshold. When the operating frequency $f_c$ of the cryptographic circuit 112 is lower than the reference frequency threshold, the MPFKC AVS controller 350 implements the MPFKC AVS countermeasure process. For example, for each clock period that the operating frequency $f_c$ is below the specified frequency threshold, the MPFKC AVS controller 350 selects a random number of false keys $K_{f,i}$ to add to a plaintext value A that is concurrently input during the clock period. In other words, if the operating frequency $f_c$ of the cryptographic circuit 112 is lower than the reference frequency threshold, a random number of the first plurality of switches 330 ($S_i$) are turned-on and the respective complementary second switches 132 ($\overline{S}i$) are turned-off.

Security threats and LPA attacks on the cryptographic circuit 112 can be modeled. LPA attacks explore the correlation between input data (plain text) and actual leakage power dissipation of a cryptographic circuit. A circuit without any countermeasure against LPA attacks may be referred to as a conventional cryptographic circuit. Assuming that in an LPA attack on a conventional cryptographic circuit, x is the predicted leakage power dissipation of the cryptographic circuit by an attacker after combining the input data and correct key with a suitable power model. If the actual leakage power dissipation of the cryptographic circuit is y, the relationship between x and y can be denoted as $$y=\alpha x+\beta, \quad (5)$$

where $\alpha$ and $\beta$ can be considered as the multiplicative and additive noise, respectively. Since both multiplicative noise and additive noise may exist in a cryptographic circuit, it is quite difficult to quantify the signal-to-noise ratio (SNR) from equation (5).

Fortunately, since the SNR of a system strongly correlates with the correlation coefficient, the SNR of a conventional cryptographic circuit can be determined by calculating the correlation coefficient. If an attacker applies $m_1$, ($m_1$ is sufficiently large) number of data to a conventional cryptographic circuit, the corresponding predicted leakage power and actual leakage power are, respectively, $x_1, x_2, \ldots, x_{m1}$ and $y_1, y_2, \ldots, y_{m1}$. The correlation coefficient $\gamma(x, y)$ between the predicted and actual leakage power is $$\gamma(x, y) = \frac{\sum_{i_1=1}^{m_1}(x_{i_1}-\overline{x})(y_{i_1}-\overline{y})}{\sqrt{\sum_{i_1=1}^{m_1}(x_{i_1}-\overline{x})^2 \sum_{i_1=1}^{m_1}(y_{i_1}-\overline{y})^2}}, \quad (6)$$

where $\overline{x}$ and $\overline{y}$ are, respectively, the mean values of $x_1, x_2, \ldots, x_{m1}$ and $y_1, y_2, \ldots, y_{m1}$. The SNR of a conventional cryptographic circuit can be determined as $$SNR = \frac{1}{\frac{1}{(\gamma(x, y))^2}-1}. \quad (7)$$

Since the security of a cryptographic circuit is determined by the SNR value, a similar system with the same SNR can be used to evaluate the security of the actual conventional cryptographic circuit. When an equivalent additive noise $\xi \sim N(\mu_0, \sigma^2)$ is utilized to simulate a conventional cryptographic circuit against LPA attacks, the relationship between x and y can be modified as $$y=\alpha_0 x+\xi, \quad (8)$$

where $\alpha_0$ is the mean value of $\alpha$. Since $$\frac{1}{m_1}\sum_{i_1=1}^{m_1} y_{i_1} = \alpha_0 \frac{1}{m_1}\sum_{i_1=1}^{m_1} x_{i_1} + \frac{1}{m_1}\sum_{i_1=1}^{m_1} \xi_{i_1}, \quad (9)$$

where $\xi_{i_1}$ is the corresponding equivalent additive noise due to the $i_1^{th}$ input data, $\alpha_0$ can be written as $\alpha_0=(\overline{y}-\mu_0)/\overline{x}$.

Since the new system has the same SNR as a conventional cryptographic circuit, the below equation (10) is satisfied $$\frac{1}{\frac{1}{(\gamma(x, y))^2}-1} = \frac{D(\alpha_0 x)}{\sigma^2}, \quad (10)$$

where $D(\alpha_0 x)$ represents the variance of $\alpha_0 x$. The variance $\sigma^2$ of the equivalent additive noise $\xi$ can therefore be obtained as $$\sigma^2 = \left(\frac{\overline{y}-\mu_0}{\overline{x}}\right)^2 D(x)\left(\frac{1}{(\gamma(x, y))^2}-1\right). \quad (11)$$

Security can be evaluated for single false key-controlled (SFKC) aggressive voltage scaling (AVS) system and for multiple parallel false keys-controlled (MPFKC) aggressive voltage scaling (AVS) system that are utilized for counteracting LPA attacks.

The actual leakage power dissipation y of a conventional cryptographic circuit can be expressed as $$y=V_{dd,0}I_{leak}=V_{dd,0}F(V_{dd,0})I_l=\omega_0 I_l \quad (12)$$

where $I_{leak}$ is the actual leakage current of the cryptographic circuit, $I_l$ is the leakage component which is independent of supply voltage, and F ($V_{dd,0}$) is the leakage component which is determined by supply voltage. By substituting (8) into (12), $I_l$ can be written as $$I_l = \frac{\alpha_0 x + \xi}{\omega_0}. \tag{13}$$

When the SFKC AVS technique is enabled on a cryptographic circuit 112, the actual leakage power dissipation $y^*(\Delta_{v,x})$ can be modeled as $$y^*(\Delta v, x) = (V_{dd,0} + \Delta v)F(V_{dd,0} + \Delta v)I_1 \tag{14}$$

$$= (V_{dd,0} + \Delta v)F(V_{dd,0} + \Delta v)\frac{\alpha_0 x + \xi}{\omega_0}.$$

F ($V_{dd,0}+\Delta_v$) can be approximated with the polynomial expansion as $$F(V_{dd,0} + \Delta v) \approx g_0 + \sum_{i_2=1}^{m_2} g_{i_2}(V_{dd,0} + \Delta v)^{i_2}, \tag{15}$$

where $m_2$ is the degree of the approximated polynomial and $g_{i_2}$ ($i_2$=0, 1, . . . , $m_2$) is the corresponding coefficient of ($V_{dd,0}+\Delta_v$)$^{i_2}$. Accordingly, ($V_{dd,0}+\Delta_v$)F($V_{dd,0}+\Delta_v$) can be approximated as $$(V_{dd,0} + \Delta v)F(V_{dd,0} + \Delta v) \approx g_0(V_{dd,0} + \Delta v) + \sum_{i_2=1}^{m_2} g_{i_2}(V_{dd,0} + \Delta v)^{i_2+1} = \tag{16}$$

$$c_0 + \sum_{i_3=1}^{m_2+1} c_{i_3}(\Delta v)^{i_3},$$

where $c_{i_3}$ ($i_3$=0, 1, . . . , $m_2$+1) is the corresponding coefficient of $(\Delta_v)^{i_3}$.

If a certain constant input data (the predicted leakage power is $x_0$) is applied to a cryptographic circuit 112 and ($m_2$+3) number of different supply voltages $V_{dd,0}$, $V_{dd,0}+\Delta_{v1}$, . . . , $V_{dd,0}+\Delta_{v_{m2}}+2$ are enabled, the corresponding actual leakage power dissipation of the cryptographic circuit 112 becomes, respectively, $y^*(0, x_0)$, $y^*(\Delta_{v1}, x_0)$, . . . , $y^*(\Delta v_{m_2+2}, x_0)$. Through solving the following equation $$\frac{y^*(0, x_0)}{c_0}\begin{pmatrix} 1 & \Delta v_1 & \ldots & (\Delta v_1)^{m_2+1} \\ 1 & \Delta v_2 & \ldots & (\Delta v_2)^{m_2+1} \\ \ldots & \ldots & \ldots & \ldots \\ \ldots & \ldots & \ldots & \ldots \\ \ldots & \ldots & \ldots & \ldots \\ 1 & \Delta v_{m_2+2} & \ldots & (\Delta v_{m_2+2})^{m_2+1} \end{pmatrix}\begin{pmatrix} c_0 \\ c_1 \\ \vdots \\ c_{m_2+1} \end{pmatrix} = \tag{17}$$

$$\begin{pmatrix} y^*(\Delta v_1, x_0) \\ y^*(\Delta v_2, x_0) \\ \vdots \\ y^*(\Delta v_{m_2+2}, x_0) \end{pmatrix},$$

the coefficients $c_0, c_1, \ldots, c_{m_2+1}$ can be determined. When another $m_3$, ($m_3$ is sufficiently large) number of different supply voltages $V_{dd,0}+\Delta'_{v_1}, \ldots, V_{dd,0}+\Delta'_{v_{m3}}$ are enabled to the cryptographic circuit 112, the corresponding actual leakage power dissipation of the cryptographic circuit 112 becomes, respectively, $y^*(\Delta'_{v_1}, x_0), \ldots, y^*(\Delta'_{v_{m3}}, x_0)$. By minimizing the matching error $$\sum_{i_4=1}^{m_3} \left( \frac{y^*(0, x_0)}{c_0}\left(c_0 + \sum_{i_3=1}^{m_2+1} c_{i_3}(\Delta v'_{i_4})^{i_3}\right) - y^*(\Delta v'_{i_4}, x_0)\right)^2,$$

the optimum value of $m_2$ can be determined. $y^*(\Delta v, x)$ can therefore be approximately written as $$y^*(\Delta v, x) \approx \left(c_0 + \sum_{i_3=1}^{m_2+1} c_{i_3}(\Delta v)^{i_3}\right)\frac{\alpha_0 x + \xi}{\omega_0}. \tag{18}$$

If the Hamming-weight (HW) model is utilized by the attacker to predict the leakage power dissipation of the cryptographic circuit 112, x and $\Delta v$ can also, respectively, be denoted as $$x = \sum_{i=1}^{n} a_i \oplus k_{c,i} = \sum_{i=1}^{n} x_i, \tag{19}$$

$$\Delta v = \left(\sum_{i=1}^{n} a_i \oplus k_{f,i}\right)v_0 = \left(\sum_{i=1}^{n} x_i \oplus k_{f,i} \oplus k_{c,i}\right)v_0. \tag{20}$$

If one of the arbitrary keys $K_o=(K_{o,1}, K_{o,2}, \ldots, K_{o,n})$, the correlation coefficients of correct key $K_c$, added false key $K_f$, and that particular arbitrary key $K_o$ are, respectively, $\gamma(\Sigma_{i=1}^{n}x_i, y^*(\Delta_v, x))$, $\gamma(\Sigma_{i=1}^{n}x_i \oplus K_{f,i} \oplus K_{c,i}, y^*(\Delta v, x))$, and $\gamma(\Sigma_{i=1}^{n}x_i \oplus K_{o,i} \oplus K_{c,i}, y^*(\Delta v, x))$. In this regards, all of the possible keys can be categorized as the correct key, added false key, or an arbitrary key. Any key other than the correct key and the added false key may be referred to as the arbitrary key.

Figure 4:
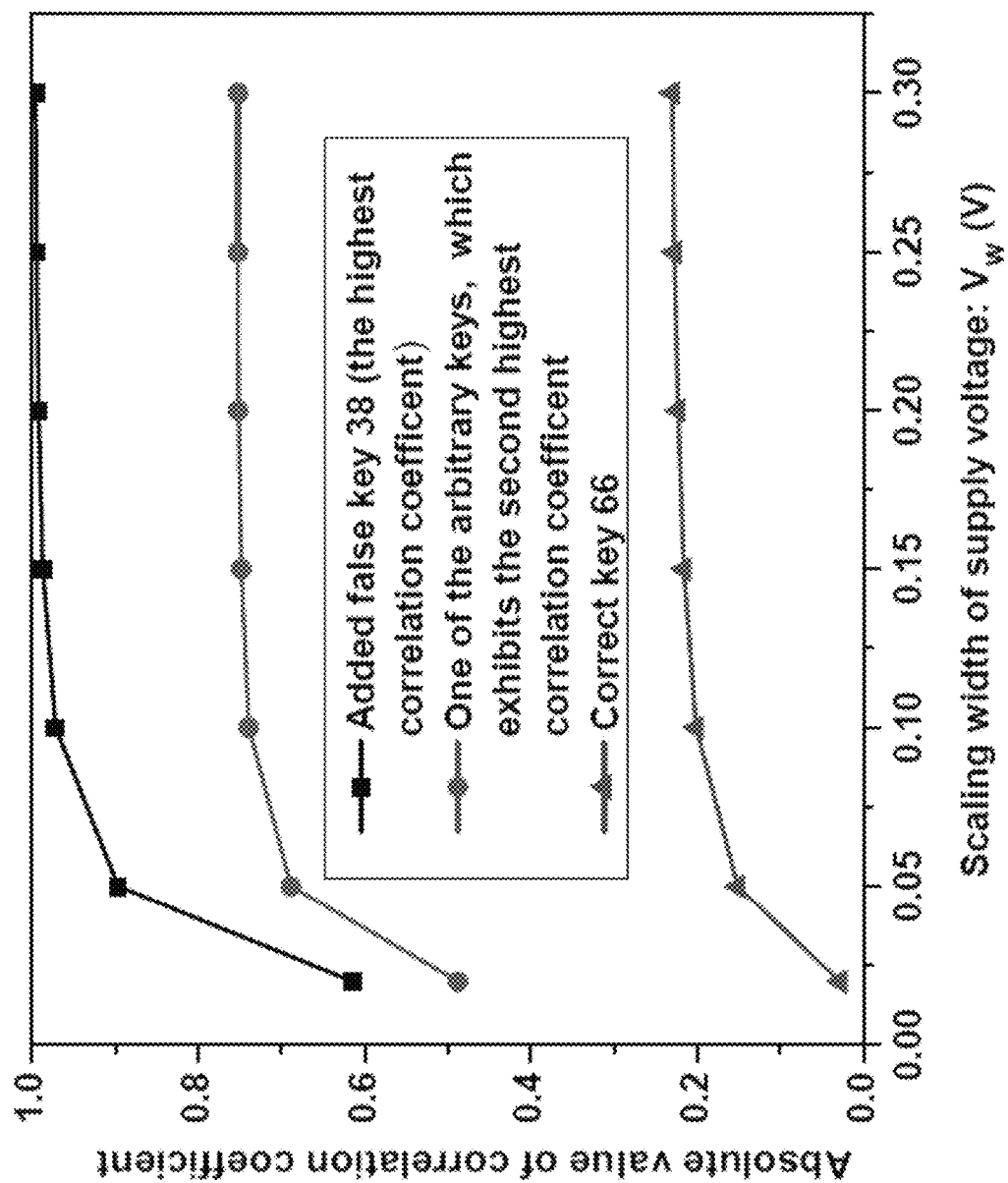
FIG. 4 illustrates a number of plots including supply voltage scaling width (Vw) versus absolute values of correlation coefficients for different keys, for a substitution box (S-box) that employs a single false key controlled (SFKC) aggressive voltage scaling (AVS) technique against LPA attacks, according to some embodiments.

FIG. 4 illustrates plots including voltage supply scaling width (Vw) versus absolute values of correlation coefficients of different keys for a substitution box (S-box) that employs the SFKC AVS technique against LPA attacks when a Hamming-weight (HW) model is utilized by an attacker (Kf=38), according to some embodiments.

For a 130 nm CMOS substitution-box (S-box) with the SFKC AVS technique, as shown in FIG. 4, the added false key 38 shows the highest correlation coefficient by controlling the scaling of supply voltage. The correlation coefficient of correct key 66 is also lower than the second highest correlation coefficient with the impact of the added false key 38. In addition, when $V_w$ exceeds 0.1 V, the variations of the correlation coefficient of different keys start converging.

The multiple parallel false keys-controlled (MPFKC) aggressive voltage scaling (AVS) technique against LPA attacks is provided in order to prevent an attacker from unriddling the scaling behavior of supply voltage. A random number of false keys are added to plaintext in every clock period in the proposed MPFKC AVS technique. As a result, the actual leakage power dissipation of a cryptographic circuit 112 that employs MPFKC AVS technique y**(Δv*, x) is $$y^{**}(\Delta v, x) \approx \left(c_0 + \sum_{i_3=1}^{m_2+1} c_{i_3}(\Delta v^*)^{i_3}\right)\frac{\alpha_0 x + \xi}{\omega_0}, \quad (21)$$

where Δv* is $$\Delta v^* = \left(\sum_{j=1}^{m}S_j\sum_{i=1}^{n}a_i \oplus k_{f,j,i}\right)v_1 \quad (22)$$

$$= \left(\sum_{j=1}^{m}S_j\sum_{i=1}^{n}x_i \oplus k_{f,j,i} \oplus k_{c,i}\right)v_1$$

when HW model is utilized by the attacker.

Figure 5:
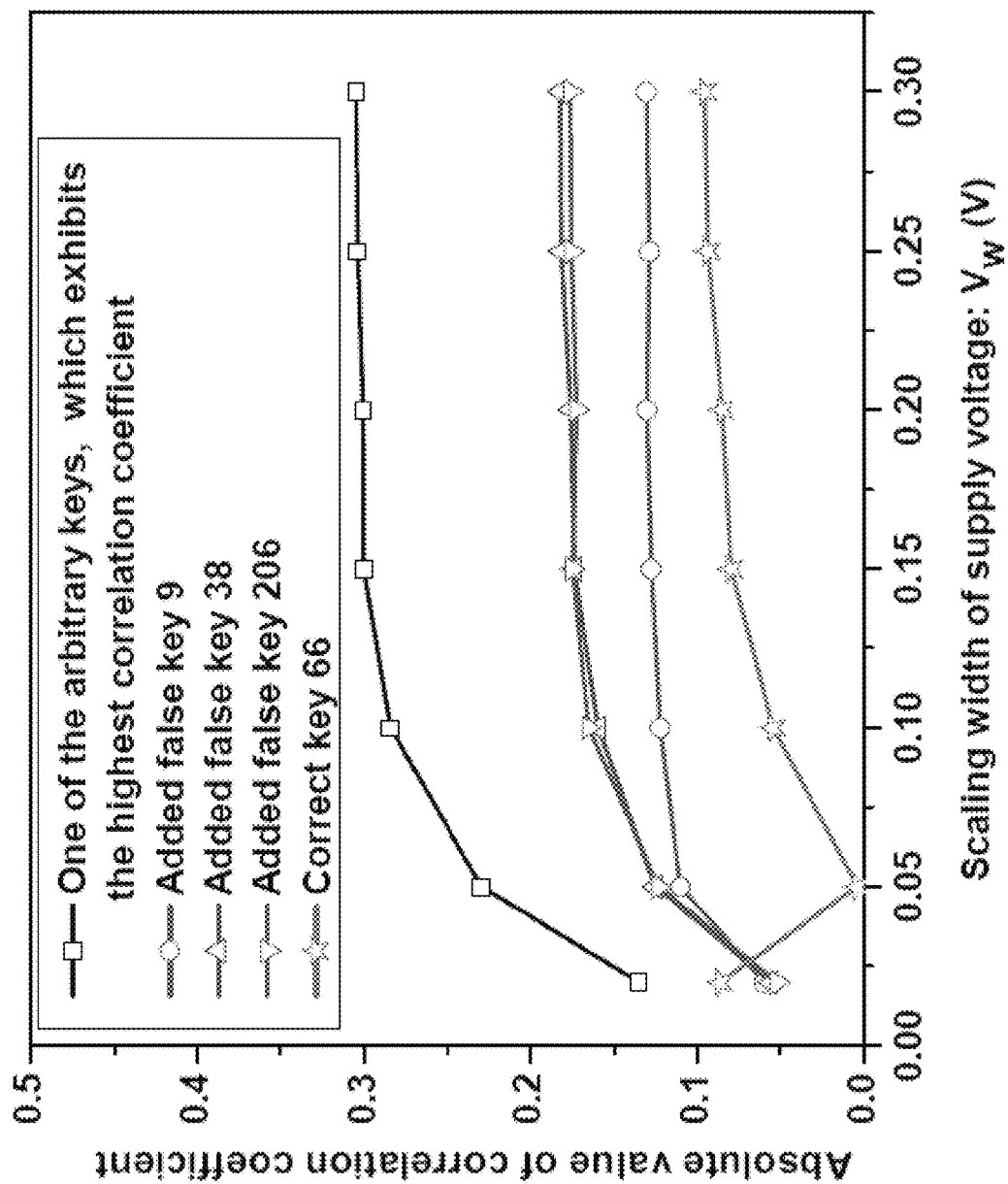
FIG. 5 illustrates plots including supply voltage scaling width ($V_w$) versus absolute values of correlation coefficients for different keys, for an S-box that employs a multiple parallel false key controlled (MPFKC) aggressive voltage scaling (AVS) technique against leakage power analysis (LPA) attacks, according to some embodiments.

FIG. 5 illustrates plots including supply voltage scaling width $V_w$ versus absolute values of correlation coefficient for different keys for an S-box that employs the MPFKC AVS technique against LPA attacks, when a Hamming-weight (HW) model is utilized by an attacker, where m=3, $K_{f,1}$=9, $K_{f,2}$=38, and $K_{f,3}$=206, according to some embodiments. As shown in FIG. 5, the added false keys and the correct key do not exhibit the highest correlation coefficient with the MPFKC AVS technique. The primary reason is that leakage power dissipation of the cryptographic circuit 112 contains information about all of the added false keys when MPFKC AVS technique is enabled. Each added false key exhibits a high correlation with a portion of the leakage power dissipation induced by itself, but it may have a low correlation with the portion of the leakage power dissipation induced by other added false keys. However, an arbitrary key may have a high correlation with the components of the leakage power dissipation induced by different added false keys, resulting in a high correlation with the overall sidechannel signal, as shown in FIG. 6D. Another observation is that when $V_w$ approaches 0.05 V, the critical signal that is leaked from the correct key is significantly attenuated by the noise due to the added false keys. This is due to the fact that the added multiple false keys start to become more effective when $V_w$ exceeds 0.05 V.

FIGS. 6A-6D illustrate plots of different keys versus absolute values of correlation coefficient under leakage power analysis (LPA) attacks simulation ($V_w$=0:2 V) when a Hamming-weight (HW) model is utilized by the attacker. The polarity of the correlation coefficient can be used to discriminate the correct key and complement of the correct key. FIG. 6A represents an S-box without countermeasure after inputting 500 plaintexts. FIG. 6B represents an S-box that employs random AVS technique after inputting 100 thousand plaintexts FIG. 6C represents an S-box that employs SFKC AVS technique after inputting 10 million plaintext values. FIG. 6D represents an S-box that employs MPFKC AVS technique after inputting 10 million plaintexts, according to some embodiments.

A 130 nm CMOS S-box that employs different countermeasures against LPA attacks is simulated in Cadence. Only 500 plaintexts are sufficient to leak the correct key 66 to the attacker from an S-box without a countermeasure, as shown in FIG. 6A. If an S-box employs random AVS technique, as shown in FIG. 6B, after inputting 100 thousand plaintexts, the random power noise is filtered and the correct key 66 is also leaked to the attacker. As shown in FIG. 6C, if an S-box employs SFKC AVS technique, the added false key 38 exhibits the highest correlation coefficient even if 10 million plaintexts are enabled. But the added false key 38 may be utilized by the attacker to unriddle the scaling behavior of supply voltage to leak the correct key 66. Alternatively, for an S-box with MPFKC AVS technique, the correct key 66 is masked from an LPA attack even if 10 million plaintexts are utilized, as shown in FIG. 6D.

As a result, if the average leakage power dissipation of a conventional S-box without countermeasure is $X_l$ and $V_w$=0.2 V, the average leakage power dissipation of the S-box that employs random AVS technique, SFKC AVS technique, and MPFKC AVS technique, respectively, are 0.8160$X_l$, 0.8162$X_l$, and 0.9039$X_l$. In MPFKC AVS technique, a smaller variance of the supply voltage scaling causes a slightly higher average leakage power dissipation on the S-box, as compared to the random AVS and the SFKC AVS techniques. The MPFKC AVS technique bears approximately 6.4 percent area overhead, which consists of 3.4 percent area overhead induced by the inserted control circuit and 3 percent area overhead induced by the duplication of the registers to fix the circuit contamination delay.

TABLE I

Comparison with Previous Works (X__a, X__d, and X__1, are respectively the area, the dynamic power, and the leakage power of a conventional cryptographic circuit).

|  | Area | Dynamic Power | Leakage Power | MTD Value |
|---|---|---|---|---|
| SDRL | 2$X_a$ | 2$X_d$ | 2$X_1$ | — |
| SC converter + RDVFS | $X_a$ | 0.746$X_d$ | 0.7116$X_1$ | ≥1 million |
| False Key Controlled AVS | 1.064$X_a$ | 0.5$X_d$ | 0.9039$X_1$ | ≥10 million |

In some embodiments, when an LPA attack is not detected by the MPFKC AVS controller 350 and the cryptographic circuit 112 is working at the normal clock frequency, random AVS can be utilized to reduce dynamic power dissipation of the cryptographic circuit 112 by 50%, as listed in Table I. When the clock frequency $f_c$ becomes lower than the reference threshold or the critical frequency $F_0$, the MPFKC AVS technique is activated against LPA attacks. As compared to the random voltage scaling technique, the MTD value of the MPFKC AVS technique can be enhanced over 10 times against LPA attacks.

An adaptive false key-controlled aggressive voltage scaling technique is described as a countermeasure against LPA attacks. The techniques described herein can enhance the correlation between the added false keys and actual leakage power dissipation of the cryptographic circuit. The MTD value of a cryptographic circuit against LPA attacks is enhanced over 10 million with the described techniques that inserts a random number of false keys to control the scaling behavior of the supply voltage in every clock period.

Various features and advantages of the invention are set forth in the following claims.

What is claimed is:

1. A system for false key-controlled voltage scaling, the system comprising:
a power supply comprising an analog input, and an output that provides power to a cryptographic circuit;
an electronic controller operatively coupled to the analog input of the power supply, wherein the electronic controller:
receives a plaintext value that is also input to the cryptographic circuit, wherein the cryptographic circuit modifies the plaintext value with a correct key;
controls, based on a result of the plaintext value modified by a first false key, the analog input to scale the power provided via the output of the power supply to the cryptographic circuit; and
wherein the electronic controller selects a random number of parallel false keys, and for every selected parallel false key, modifies an instance of the plaintext value with a respective one of the selected parallel false keys during a same clock period for determining a magnitude of the scaling of the power provided to the cryptographic circuit.

2. The system of claim 1, wherein the electronic controller controls the analog input to scale the power provided to the cryptographic circuit during the same clock period when the cryptographic circuit modifies the plaintext value with the correct key.

3. The system of claim 1 further comprising:
a data converter that receives the result of the plaintext value modified by the first false key and generates an analog signal to drive the analog input, wherein the result of the plaintext value modified by the first false key determines a magnitude of the scaling of the power provided to the cryptographic circuit.

4. The system of claim 1 further comprising:
a frequency comparator that detects when an operating frequency of the cryptographic circuit falls below a reference frequency threshold, wherein the electronic controller controls the power provided to the cryptographic circuit further based on the detection of the operating frequency of the cryptographic circuit falling below the reference frequency threshold.

5. The system of claim 1, wherein the modification of the plaintext value with the first false key occurs in response to an operating frequency of the cryptographic circuit falling below a reference frequency threshold.

6. The system of claim 1, wherein the electronic controller determines the result of the plaintext value modified by the first false key based on a logical combination of the plaintext value and a value of the first false key.

7. The system of claim 1, wherein the electronic controller controls the power provided to the cryptographic circuit further based on the plaintext value modified by a second false key during the same clock period.

8. The system of claim 1, wherein a random number of false keys are used to modify the plaintext value in every clock period for the scaling of the power provided to the cryptographic circuit.

9. The system of claim 1, wherein a key that is detectable within a power trace of the scaled power provided to the cryptographic circuit with a highest correlation coefficient relative to a known key is a key other than the correct key.

10. A method for false key-controlled voltage scaling, the method comprising:
providing power to a cryptographic circuit via an output of a power supply;
receiving by an electronic controller operatively coupled to an analog input of the power supply, a plaintext value that is also input to the cryptographic circuit, wherein the cryptographic circuit modifies the plaintext value with a correct key;
controlling, by the electronic controller and based on a result of the plaintext value modified by a first false key, the analog input to scale the power provided to the cryptographic circuit; and
wherein the electronic controller selects a random number of parallel false keys, and for every selected parallel false key, modifies an instance of the plaintext value with a respective one of the selected parallel false keys during a same clock period for determining a magnitude of the scaling of the power provided to the cryptographic circuit.

11. The method of claim 10, wherein controlling the power provided to the cryptographic circuit is further based on the result of the plaintext value modified by the first false key occurs during the same clock period when the cryptographic circuit modifies the plaintext value with the correct key.

12. The method of claim 10 further comprising:
receiving, by a data converter, the result of the plaintext value modified by the first false key;
generating an analog signal to drive the analog input; and
determining a magnitude of the scaling of the power provided to the cryptographic circuit based on the result of the plaintext value modified by the first false key.

13. The method of claim 10 further comprising:
detecting when an operating frequency of the cryptographic circuit falls below a reference frequency threshold; and
determining when to scale the power provided to the cryptographic circuit based on the detection of the operating frequency of the cryptographic circuit falling below the reference frequency threshold.

14. The method of claim 10, wherein the modification of the plaintext value with the first false key occurs in response to an operating frequency of the cryptographic circuit falling below a reference frequency threshold.

15. The method of claim 10, wherein the result of the plaintext value modified by the first false key is determined based on a logical combination of the plaintext value and a value of the first false key.

16. The method of claim 10, wherein controlling the analog input to scale the power provided to the cryptographic circuit is further based on the result of the plaintext value modified by the first false key and the plaintext value modified by a second false key during the same clock period.

17. The method of claim 10, wherein a random number of false keys are used to modify the plaintext value in every clock period for the scaling of the power provided to the cryptographic circuit.

18. The method of claim 10, wherein a key detected within a power trace of scaled power provided to the cryptographic circuit with a highest correlation coefficient relative to a known key is a key other than the correct key.

* * * * *